US012065346B2

(12) United States Patent
Walthers

(10) Patent No.: US 12,065,346 B2
(45) Date of Patent: *Aug. 20, 2024

(54) CLAMP FORCE CONTROL SYSTEM FOR LIFT TRUCK ATTACHMENT WITH SECONDARY HYDRAULIC FORCE CONTROL CIRCUIT

(71) Applicant: Cascade Corporation, Fairview, OR (US)

(72) Inventor: Christopher M. Walthers, Gresham, OR (US)

(73) Assignee: Cascade Corporation, Fairview, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/466,951

(22) Filed: Sep. 3, 2021

(65) Prior Publication Data

US 2021/0395061 A1 Dec. 23, 2021

Related U.S. Application Data

(63) Continuation of application No. 15/367,002, filed on Dec. 1, 2016, now Pat. No. 11,136,229.

(51) Int. Cl.

| | |
|---|---|
| ***B66F 9/18*** | (2006.01) |
| ***B66F 9/22*** | (2006.01) |
| ***F15B 3/00*** | (2006.01) |
| ***F15B 11/028*** | (2006.01) |
| ***F15B 11/032*** | (2006.01) |
| ***F15B 11/16*** | (2006.01) |

(52) U.S. Cl.

CPC ................ *B66F 9/183* (2013.01); *B66F 9/22* (2013.01); *F15B 3/00* (2013.01); *F15B 11/028* (2013.01); *F15B 11/032* (2013.01); *F15B 11/161* (2013.01); *F15B 2211/6303* (2013.01); *F15B 2211/7107* (2013.01); *F15B 2211/76* (2013.01)

(58) Field of Classification Search

CPC .. B66F 9/184; B66F 9/183; B66F 9/22; B66F 9/0755

See application file for complete search history.

(56) References Cited

U.S. PATENT DOCUMENTS

| | | | | |
|---|---|---|---|---|
| 4,423,998 | A | 1/1984 | Inaba | |
| 4,726,729 | A | 2/1988 | Olson | |
| 5,250,074 | A | 10/1993 | Wilk et al. | |
| 6,423,017 | B2 * | 7/2002 | Brotz | A61H 35/00 601/150 |
| 8,091,467 | B2 * | 1/2012 | Petronek | B66F 9/183 414/730 |
| 8,755,929 | B2 | 6/2014 | McKernan | |
| 9,290,285 | B2 | 3/2016 | Johnson et al. | |
| 9,309,099 | B2 | 4/2016 | Dal Dosso | |
| 11,136,229 | B2 * | 10/2021 | Walthers | F15B 11/161 |
| 2003/0233184 | A1 | 12/2003 | Roncari | |

(Continued)

FOREIGN PATENT DOCUMENTS

JP 2005263410 A 9/2005

*Primary Examiner* — Seahee Hong

(74) *Attorney, Agent, or Firm* — Chernoff, Vilhauer, McClung & Stenzel , LLP

(57) ABSTRACT

The improved hydraulic system utilizes a secondary hydraulic force control circuit that changes the gripping force on the load independently of movement of the clamp arms.

10 Claims, 9 Drawing Sheets

(56) References Cited

U.S. PATENT DOCUMENTS

| | | | | |
|---|---|---|---|---|
| 2006/0033350 | A1* | 2/2006 | Besch | B25B 5/065 294/119.3 |
| 2006/0104781 | A1 | 5/2006 | Merin | |
| 2006/0237888 | A1 | 10/2006 | Burton et al. | |
| 2009/0281655 | A1 | 11/2009 | McKernan et al. | |
| 2011/0276082 | A1* | 11/2011 | Fehring | A61H 1/0285 606/204 |
| 2013/0058746 | A1* | 3/2013 | Chase | B66F 9/22 414/621 |
| 2013/0310980 | A1 | 11/2013 | Matsuoka | |
| 2014/0240117 | A1 | 8/2014 | McKernan et al. | |
| 2017/0191575 | A1 | 7/2017 | Naess-Schmidt et al. | |
| 2018/0155171 | A1 | 6/2018 | Walthers | |

* cited by examiner

CLAMP FORCE CONTROL SYSTEM FOR LIFT TRUCK ATTACHMENT WITH SECONDARY HYDRAULIC FORCE CONTROL CIRCUIT

CROSS REFERENCE TO RELATED APPLICATIONS

This application is a continuation of U.S. patent application Ser. No. 15/367,002, filed Dec. 1, 2016, which is incorporated herein by reference in its entirety.

BACKGROUND

This disclosure relates generally to hydraulic valve circuits used in material handling equipment such as lift trucks and/or lift truck attachments, and more particularly, to hydraulic valve circuits adapted to control a load-gripping force for transversely movable members such as clamp arms.

Lift trucks (or similar materials handling vehicles) used to move loads from one place to another in a warehouse, for example, are typically equipped with attachments having load-lifting members such as clamp arms mounted to a carriage movably attached to a mast of the lift truck. Various different types of attachments may be mounted on the carriage of the lift truck. For example, drum-clamping forks may incorporate contours particularly useful for clamping barrels or drums. Similarly, clamp arms may be engineered differently for handling rectangular or cylindrical loads. More specifically, clamp arms adapted to handle rectangular loads such as stacked cartons or household appliances are generally referred to as carton clamps and rely on clamping forces applied to the sides of the rectangular load for lifting the load. Carton clamp attachments typically include a pair of large blade-shaped clamp members each of which can be inserted between side-by-side stacks of cartons or appliances. The clamp members on either side of the load are then drawn together, typically using hydraulic cylinders for controlling the movement of the clamp members, to apply a compressive force on the load of sufficient pressure to allow for lifting the load using the clamp members compressively engaged with the sides of the load.

Carton clamps are most frequently used in warehousing, beverage, appliance, and electronics industries and may be specifically designed for particular types of loads. For example, carton clamps may be equipped with contact pads that are sized for palletless handling of refrigerators, washers, and other large household appliances (also referred to as “white goods”). In various configurations, carton clamps may be used for handling multiple appliances at one time. Such general types of equipment, as well as those more specifically described hereafter, all constitute exemplary applications in which the hydraulic circuits described herein are intended to be used.

It is highly desirable to control the process by which clamp arms are moved to engage and subsequently lift a load, so as to avoid damaging the load by over-clamping it. Damage to the load may occur in various ways. The operator may use too little clamping force when attempting to grasp and then lift the clamped load. As a result, the load may become dislodged from the clamping members and sustain impact damage. A more likely scenario involves the operator using too much clamping force in an effort to avoid dropping the load. The result of using too much clamping force may be a crushed or deformed load.

As can easily be appreciated, controlling the clamping force of clamp arms can be a highly complex undertaking since different clamp forces will be required to lift different types, or different numbers, of cartons. For example, clamp arms used in the facilities of a large consumer goods supplier may encounter dishwashers, washing machines, clothes dryers, refrigerators, computers, furniture, televisions, etc. A clamp may thus encounter cartons having similar outward appearances and dimensions but containing products having differing optimal maximum clamping force requirements due to different load characteristics such as weight, fragility, packaging, etc. Furthermore, even when a facility warehouses a limited number of types of loads, a clamp may be utilized to simultaneously move four refrigerator cartons, then to move a single dishwasher carton, and finally a single additional refrigerator carton, presenting different load geometries also having differing optimal maximum clamping force requirements, separate from those arising from the characteristics of the loads within the cartons.

Hydraulic control systems for clamp arms therefore typically impose automatically variable limits on the clamping of a load, both on the clamping force and the speed with which the load-engaging surfaces can be closed into initial contact with the load. However, existing control systems for the force applied by load-handing clamps are often insufficient to prevent damage to loads. What is desired, therefore, is an improved control system for variably limiting the clamp force applied by clamps arms to a load being gripped.

BRIEF DESCRIPTION OF THE DRAWINGS

For a better understanding of the invention, and to show how the same may be carried into effect, reference will now be made, by way of example, to the accompanying drawings, in which.

DETAILED DESCRIPTION

Figure 1:
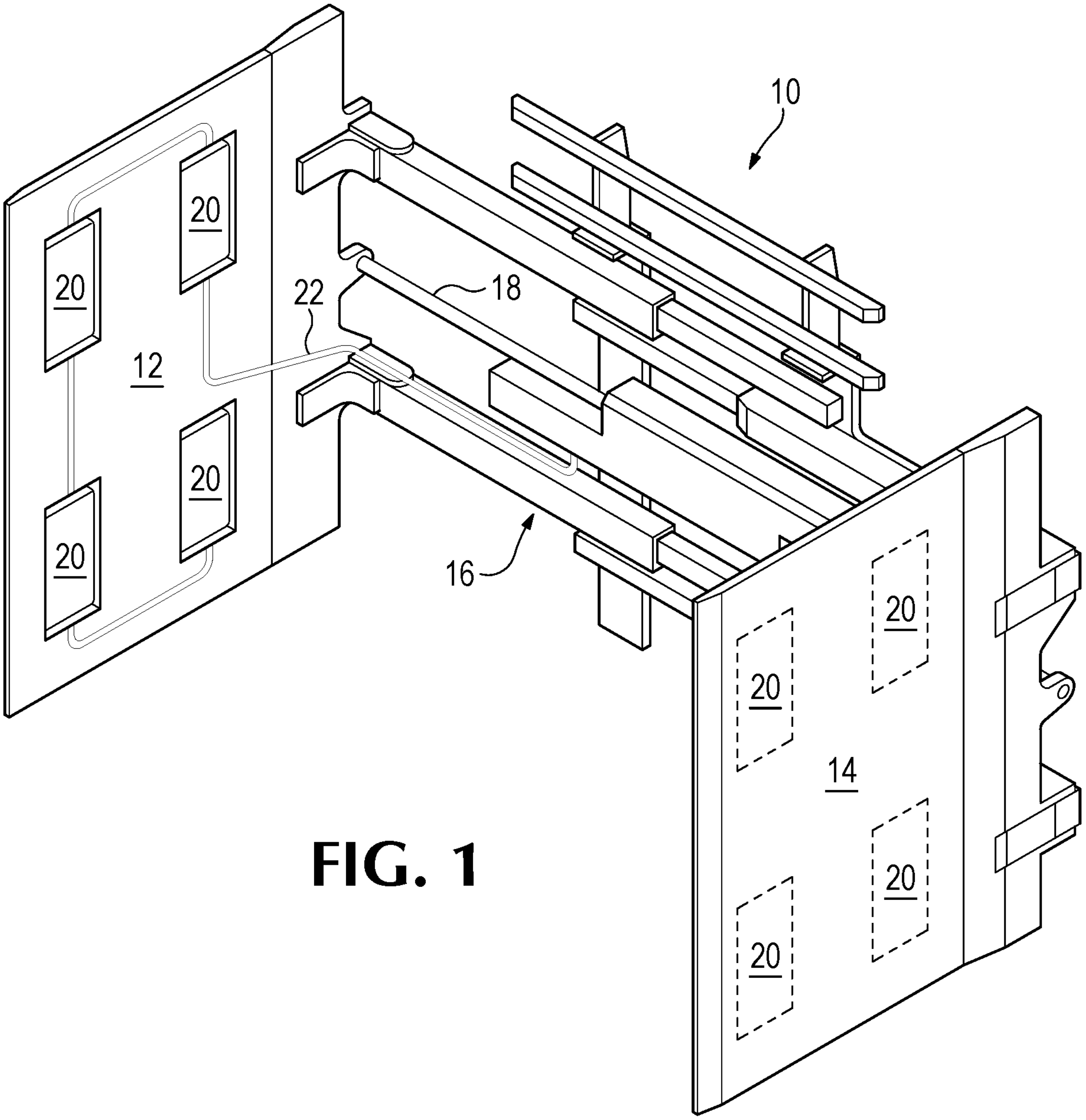
FIG. 1 shows an exemplary carton clamp attachment having four bladders used to sense the force applied to a gripped load.

Referring to FIG. 1, a carton clamp attachment 10 may comprise two opposed clamp arms 12 and 14, each slidably connected to either side of a carriage 16 selectively mountable to a mast of an industrial lift truck. The clamp arms 12 and 14 are used to alternately grip and release a load, such as a carton, through actuation of a plurality of hydraulic cylinders 18, 19 mounted to the carriage 16, each cylinder 18, 19 having its rod mounted to a respective clamp arm 12, 14.

Affixed to the inner surface of each clamp arm 12 and 14 are a plurality of bladders 20, filled with pressurized hydraulic fluid such as water, and used to sense the force by which the clamp arms 12 and 14 grip a load. As used in this specification, the term "bladder" refers to any apparatus that is filled with a fluid, and in response to external force tends to contract so as increase pressure of that fluid, and in response to increasing internal pressure of the fluid, tends to expand and increase any force against an object against which the bladder presses. Thus, the term "bladder" may include a bellows, a hydraulic cylinder, etc.

As explained in further detail below, as the clamp arms 12, 14 grip a carton, the pressure in the bladders 20 rises and is transmitted through line 22 to a pressure sensing circuit that, when the sensed pressure in the bladders rises above a threshold value, prevents the clamp arms 12 and 14 from applying additional force to the load.

Figure 2:
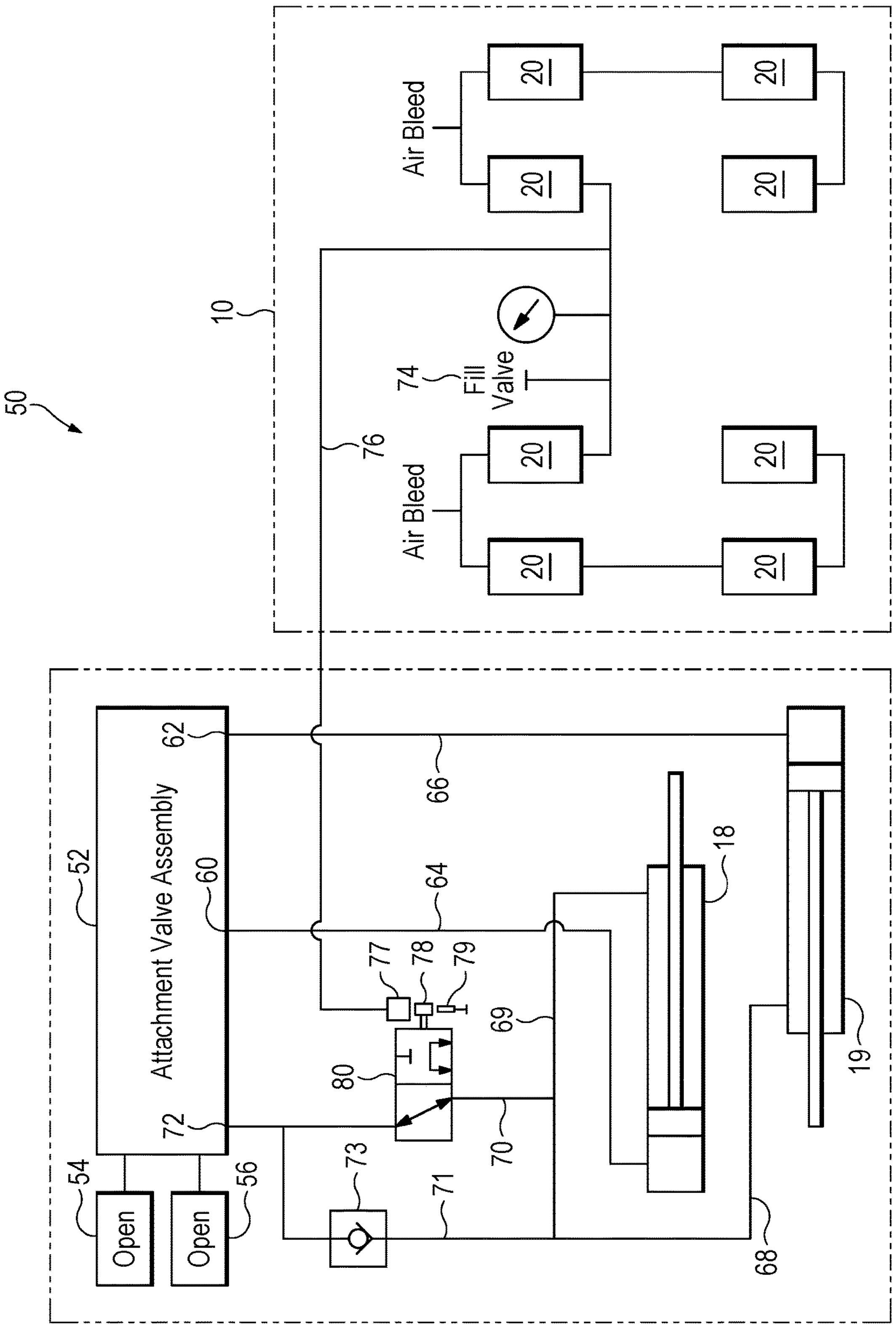
FIG. 2 Prior Art
FIG. 2 shows a hydraulic control circuit for the carton clamp attachment of FIG. 1.

Specifically, FIG. 2 shows a hydraulic control circuit 50 for operating the carton clamp attachment 10. The hydraulic control circuit 50 has an attachment valve assembly 52 that receives pressurized hydraulic fluid from a lift truck via a fluid line attached to connection 54 and returns the hydraulic fluid to the lift truck via a fluid line attached to connection 56. As the clamp arms 12 and 14 are closed so as to grip a load, the port 72 of attachment valve assembly 52 delivers high pressure fluid to the rod-side of cylinders 18 and 19 through lines 70, 68, and 69, respectively; as the high pressure fluid retracts the rods of those cylinders to bring the clamp arms 12 and 14 closer together, lower pressure fluid is expelled from the cylinders 18 and 19 and returned to the attachment valve assembly 52 through ports 60 and 62 via lines 64 and 66, respectively. Conversely, when the clamp arms 12 and 14 are opened, to release a load for example, high pressure hydraulic fluid may be provided to the piston-side of the cylinders 18 and 19 via lines 64 and 66, while low pressure fluid is expelled from the cylinders 18 and 19 and returned to the attachment valve assembly 52 though port 72 via line 71 through ball check valve 73.

The hydraulic circuit 50 automatically prevents further pressure from being supplied to the cylinders 18 and 19 through the line 72 once a threshold pressure is sensed by the bladders 20 affixed to the clamp arms 12 and 14. Specifically, a fill valve 74 is used to pre-pressurize the bladders 20 to a reference pressure, such as 5 psi for example, using fluid such as water. As the pressurized fluid is supplied to the cylinders 18 and 19, and the clamp arms 12 and 14 have moved inwards to contact the load, the pressure in the bladders 20 increases rapidly and is transmitted through line 76 to a bellows 77 that operates a spring-loaded cam 78. Once this pressure reaches a threshold pressure determined by the force of the spring 79 a rotary valve 80 rotates to a position that prevents pressurize hydraulic fluid from being supplied to the cylinders 18 and 19 through line 70, preventing the cylinders 18 and 19 from further retracting inwards against the load. Those of ordinary skill in the art will appreciate that, with the rotary valve 80 rotated to a closed position, the cylinders 18 and 19 may still be opened away from the load because check valve 73 permits fluid to be exhausted from the cylinders back to the port 72 of the attachment valve assembly 52. The detailed operation of the hydraulic control circuit 50 is provided in U.S. Patent Application Publication No. 2013/0058746, filed on Sep. 5, 2012 and published on Mar. 7, 2013, the contents of which is hereby incorporated by reference in its entirety.

Figure 3:
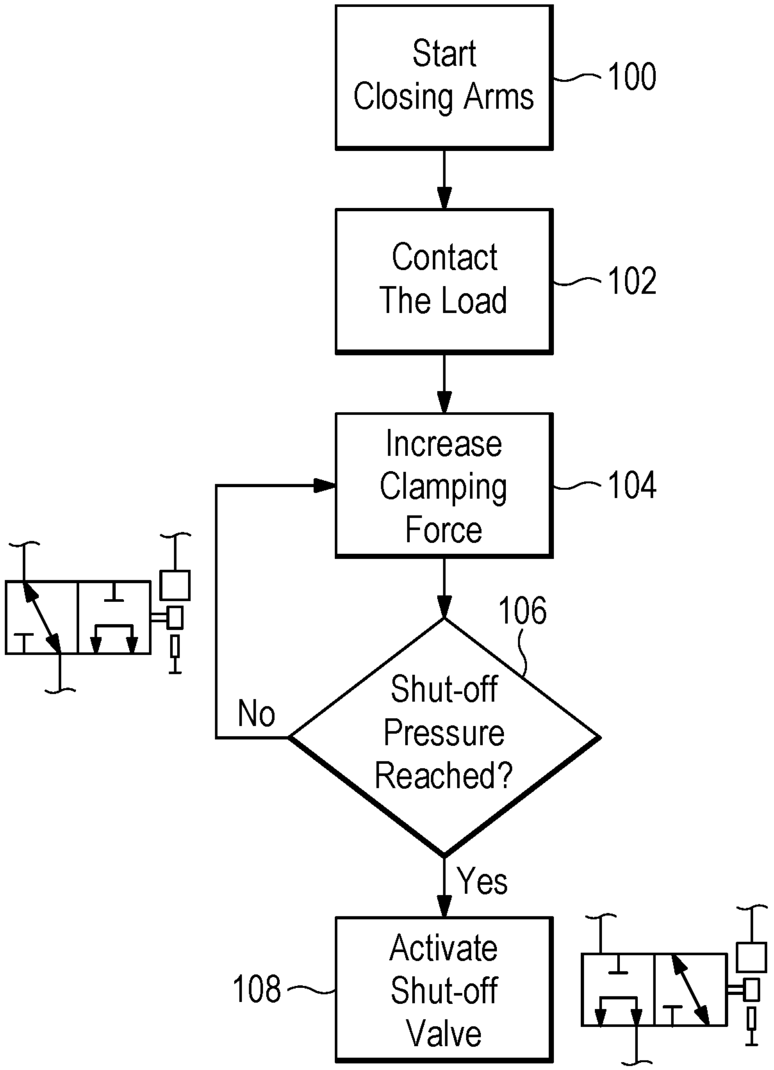
FIG. 3 Prior Art
FIG. 3 shows a flowchart illustrating the operation of the hydraulic control circuit of FIG. 1.

FIG. 3 summarizes the operation of the hydraulic control circuit 50. At step 100, the clamp arms 12, 14 are closed towards each other, until they each contact the load at step 102. Clamp force is increased at step 104. In step 106 the pressure in the bladders 20 is compared to a threshold value; if the threshold value has been reached, the shutoff valve 80 is rotated to a closed position, otherwise the procedure returns to step 104 and clamp force is increased further.

Figure 4:
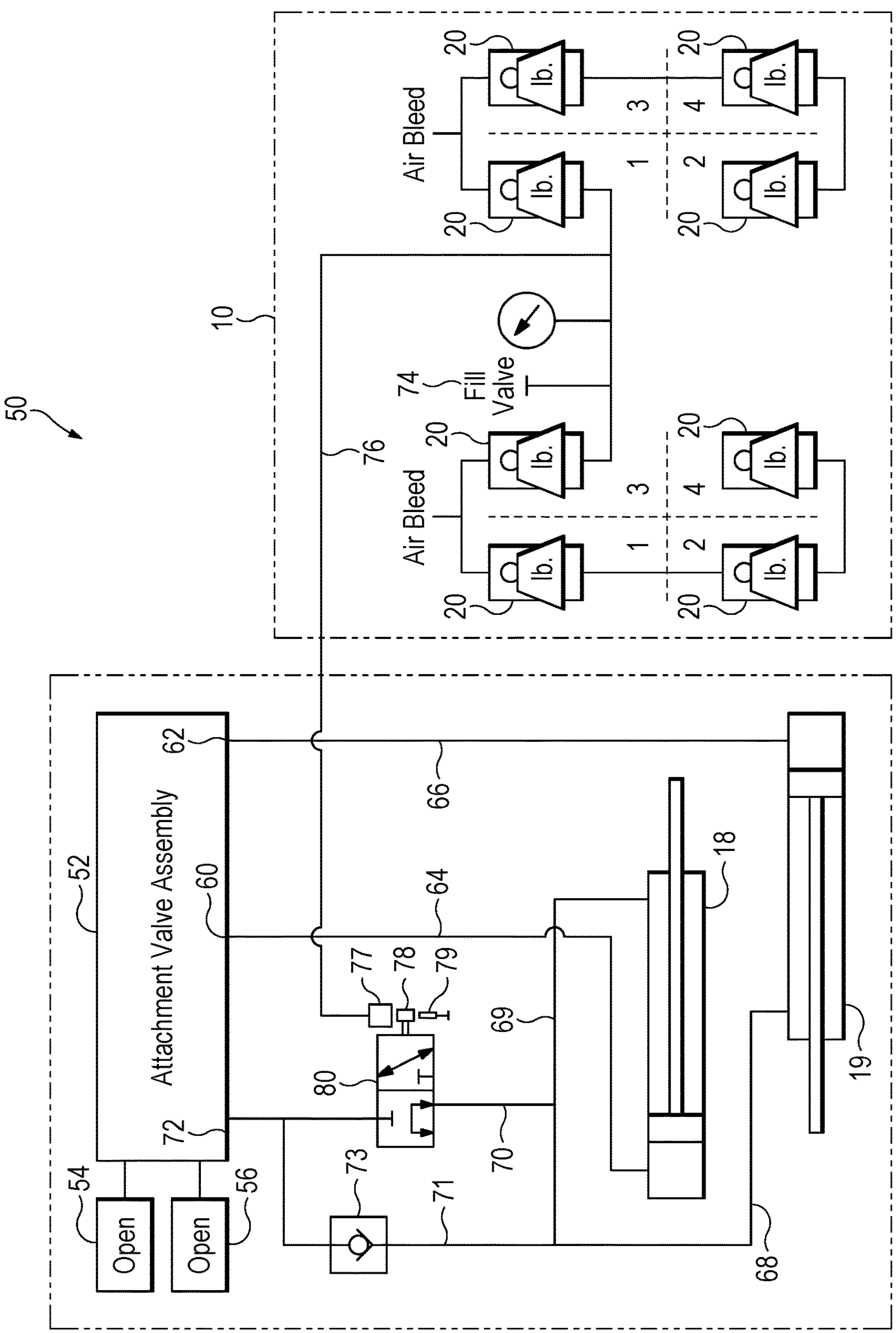
FIG. 4 shows the hydraulic control circuit of FIG. 2 being used to clamp a carton while all four of the bladders depicted in FIG. 1 contact the carton.

The hydraulic control circuit 50 shown in FIG. 2 does not operate efficiently in many circumstances. Referring to FIG. 4, for example, and assuming that: (1) the clamp arms 12 and 14 are grasping a load that contacts all the bladders 20; (2) the bladders each have a contact area against the load of 20 $in^2$; and (3) the appropriate clamp force against the load is 1920 lbs, then the threshold pressure at which the shutoff valve 80 closes would be 12 psi. Because, on this assumption, all bladders press against the load uniformly relative to each other, the pressure in all bladders should rise in unison until 12 psi is reached, at which point the shutoff valve 80 rotates to the closed position, and the and the control circuit 50 should operate ideally.

However, all bladders will rarely press against the load in unison. For example, one clamp arm may contact the load before the other clamp arm does, because the operator did not approach the load symmetrically, in which case the load may skid across the floor a short distance before the load contacts the other clamp arm. In this case, the pressure in the bladders may spike and interrupt the closing movement of the clamp arms. Furthermore, the clamp arms 12 and 14 typically are configured with a toe-in, which causes the four bladders at the front of the clamp arms 12 and 14 to contact the load before the four bladders at the back of the load do. This also may cause a pressure spike that prematurely interrupts the closing movement of the clamp arms 12 and 14; since the force on the load is proportional to the number of bladders 20 contacting the load multiplied by the pressure in the bladders 20, the shutoff valve 80 may reach the threshold cut-off pressure before all bladders 20 contact the load to apply the full clamping force to the load.

Figure 5:
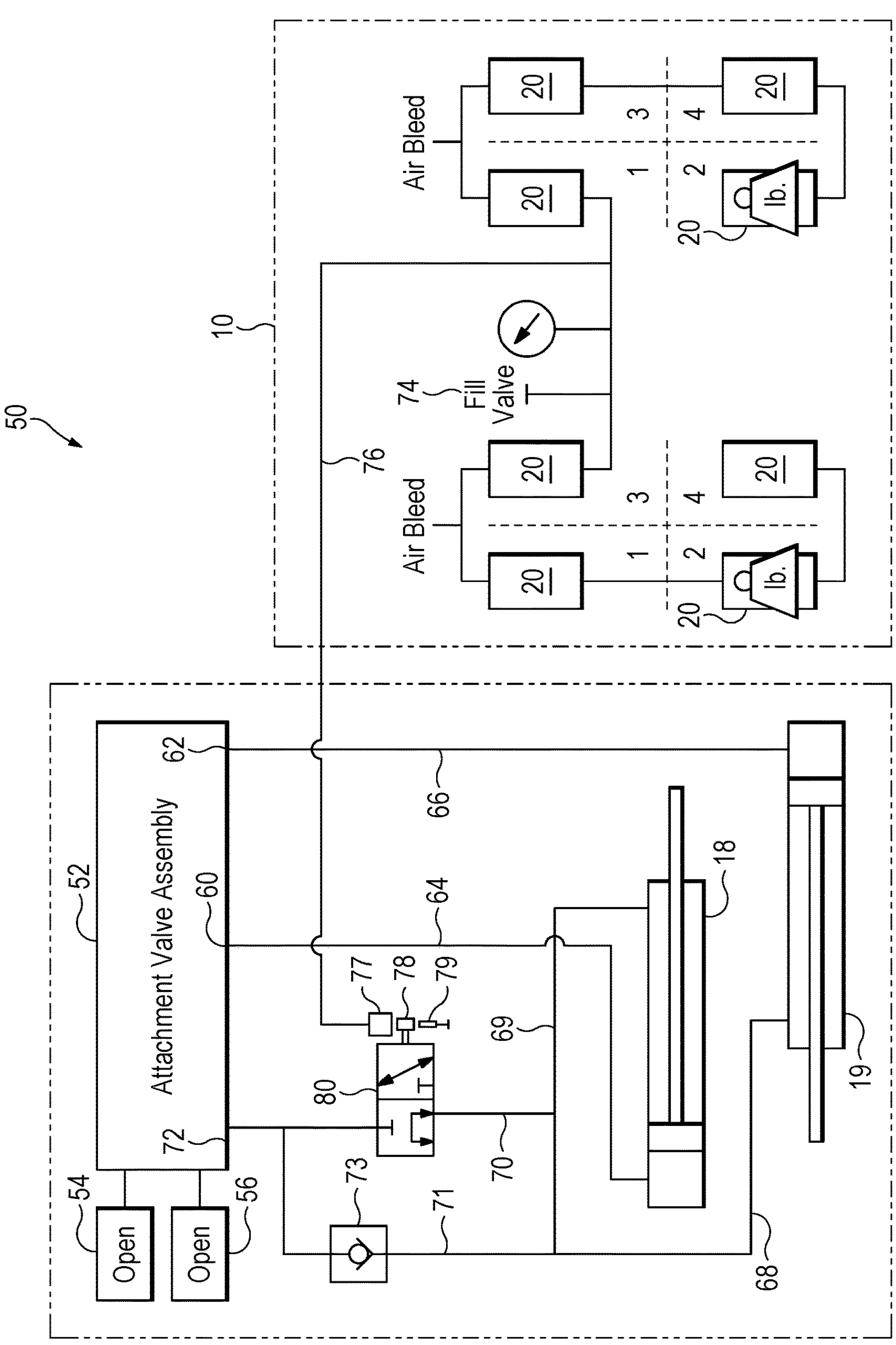
FIG. 5 shows the hydraulic control circuit of FIG. 2 being used to clamp a carton while only one of the bladders depicted in FIG. 1 contact the carton.

The issues just mentioned may be ameliorated by including restrictors at the exit of each bladder, which delay the equalization of pressure between the bladders, i.e., the restrictors create a temporary pressure differential between the pressure inside the bladder and the pressure following the exit of the bladder. However, the use of such restrictors tends to cause overshoot of the clamping force beyond what is needed to hold the load while lifting. Referring to FIG. 5, for example, when grasping loads that do not contact the full area of the clamp arms 12 and 14, the pressure in the bladders that do contact the load rise faster than pressure in the bladders that do not contact the load, and since the line 76 reflects the pressure following the exit of the top inside bladder of each clamp arm, the pressure that expands the bellows temporally lags the pressure in the bladders contacting the load. Thus, when the shutoff pressure of the valve 80 is reached, the pressure in the bladders 20 and the line 76 are still equalizing; the pressure in the line 76 will rise, the bellows 78 will expand, and the pressure in those of the bladders 80 that contact the load (and hence the clamp force) will drop. Because the final, equalized pressure must be sufficient to maintain a high enough clamp force to raise the load, this means that the use of restrictors requires temporarily clamping the load with a higher force than needed to raise the load, risking damage to the load.

Figure 6:
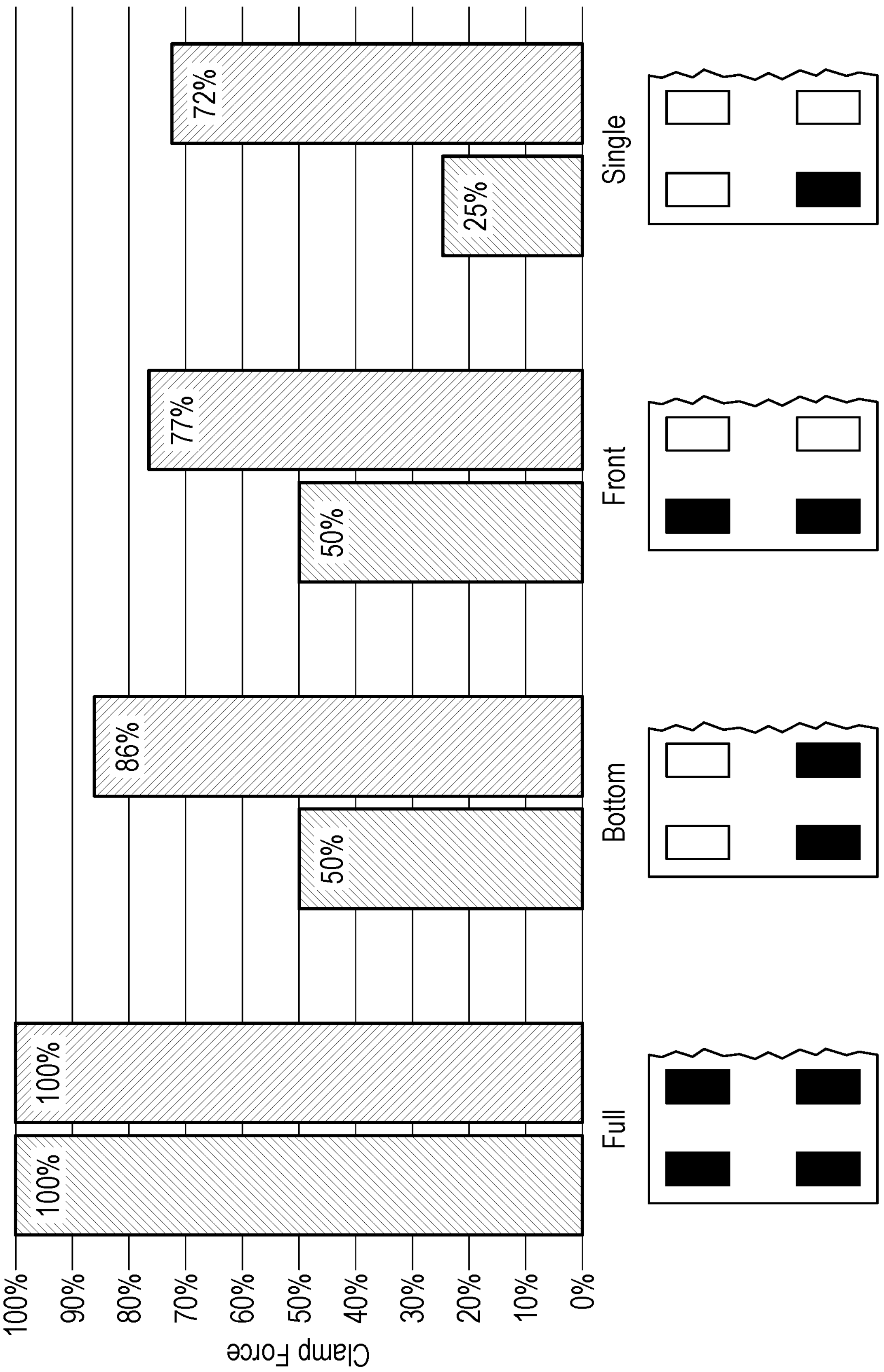
FIG. 6 shows a comparison between the theoretical maximum clamp force applied by the control system of FIG. 2 versus the actual maximum clamp force applied by the control system, for different scenarios of which bladders contact the load.

FIG. 6 shows the degree to which the use of restrictors overshoots the clamp force. As can be seen from this figure, where only one bladder on each of the clamp arms 12 and 14 is to contact the load being raised, the clamp force may overshoot by 288% of the necessary clamp force, i.e., 72% divided by 25%. Even in the case where two bladders contact the load being raised, the clamp force overshoots to approximately 165% of what is necessary to raise the load.

Figure 7:
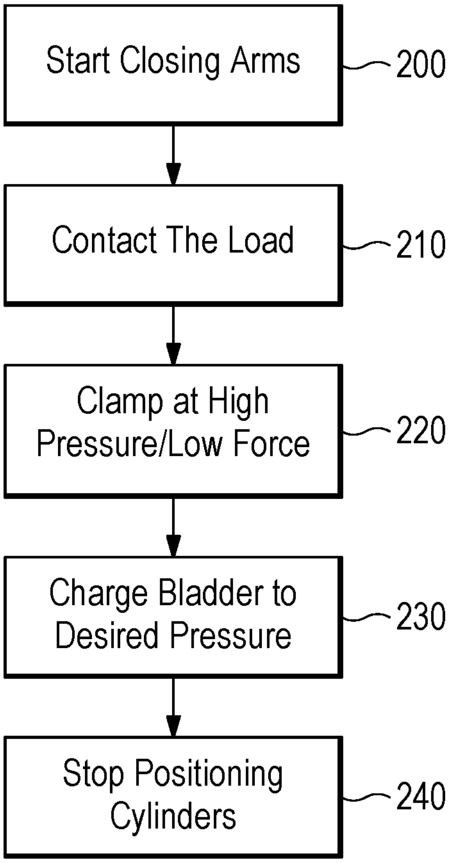
FIG. 7 shows an alternate operation for a control system for a bladder clamp.

FIG. 7 outlines an improved procedure for designing a hydraulic control circuit for operating carton clamp attachment 10. At step 200, the clamp arms 12 and 14 are closed towards the load, and at step 210 the clamp arms contact the load. Once the clamp arms contact the load, the clamp arms clamp the load at a high pressure but a low force at step 220, while the pressure in all the bladders 20 is charged by the control circuit to a threshold pressure in step 230, using the pressure provided to the cylinders 12 and 14. Once the threshold pressure is reached, the clamp pressure is shut off in step 240.

Figure 8:
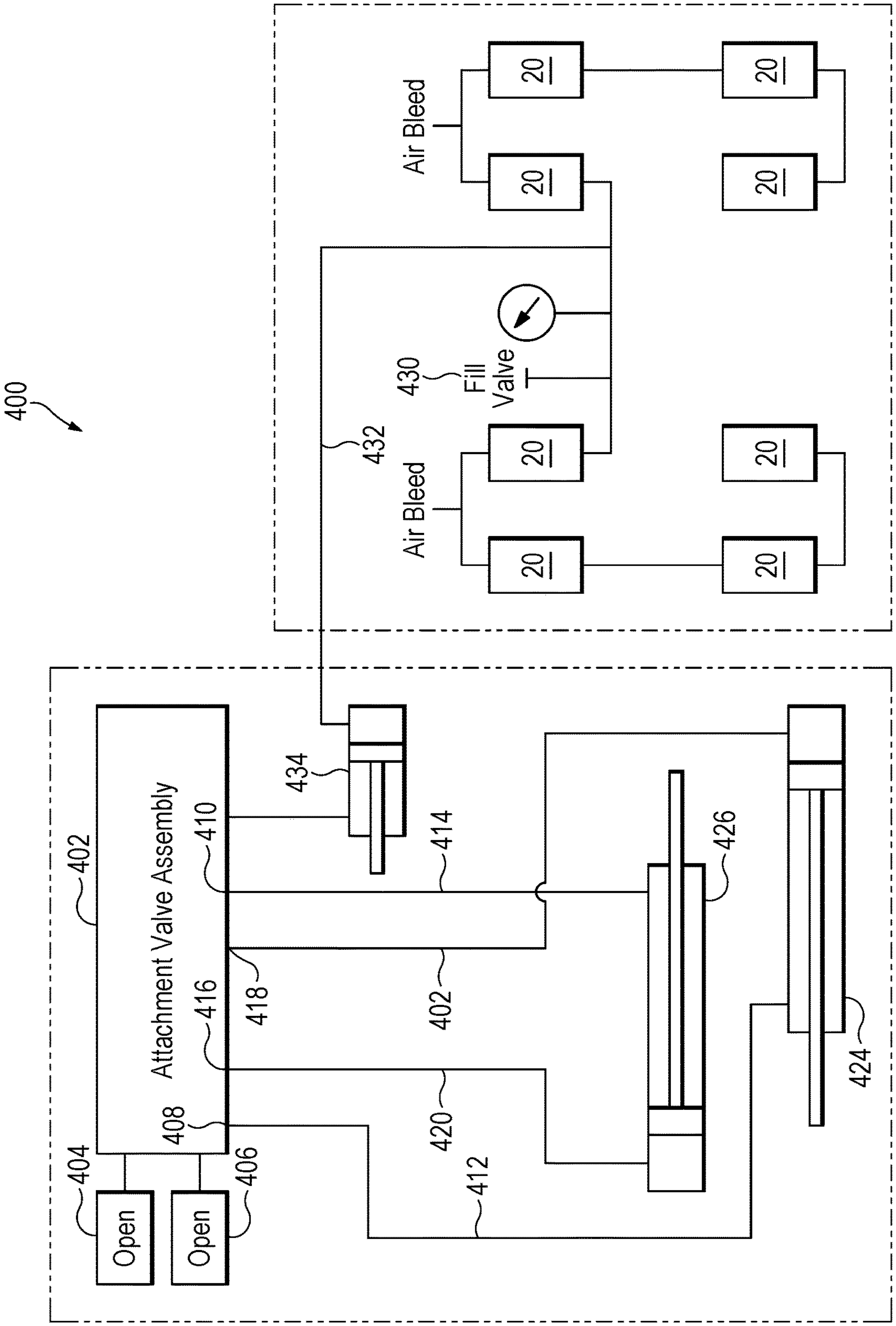
FIG. 8 shows a hydraulic control circuit that implements the system of FIG. 7.

FIG. 8 shows a hydraulic control circuit 400 for operating the carton clamp attachment 10 using the procedure shown in FIG. 7. In the circuit of FIG. 8, small diameter positioning cylinders 424 and 426 are preferably used in place of the hydraulic cylinders 18 and 19 shown in FIG. 2. The small diameter positioning cylinders 424 and 426 allow for a fast clamp arm speed and the ability to clamp at an initial low force. Those of ordinary skill in the art will appreciate, though, that the hydraulic circuit 400 may also operate with clamp cylinders such as the ones 18 and 19 depicted in FIG. 2.

The hydraulic control circuit 400 has an attachment valve assembly 402 that receives pressurized hydraulic fluid from a lift truck via a fluid line attached to connection 404 and returns the hydraulic fluid to the lift truck via a fluid line attached to connection 406. As the clamp arms 12 and 14 are closed so as to grip a load, the ports 408 and 410 of attachment valve assembly 402 deliver high pressure fluid to the rod-side of cylinders 424 and 426 through lines 412 and 414, respectively; as the high pressure fluid retracts the rods of those cylinders to bring the clamp arms 12 and 14 closer together, lower pressure fluid is expelled from the cylinders 424 and 426 and returned to the attachment valve assembly 402 through ports 416 and 418 via lines 420 and 422, respectively. Conversely, when the clamp arms 12 and 14 are opened, to release a load for example, high pressure hydraulic fluid may be provided to the piston-side of the cylinders 424 and 426 via lines 420 and 422, while low pressure fluid is expelled from the cylinders 424 and 426 and returned to the attachment valve assembly 402 though ports 408 and 410.

The hydraulic circuit 400 automatically prevents further pressure from being supplied to the cylinders 424 and 426 through the lines 408 and 410 once a threshold pressure is supplied to the bladders 20 affixed to the clamp arms 12 and 14, and that contact and apply a clamp force to the load. Specifically, a fill valve 430 is used to fill the bladders 20 using fluid such as water. As the pressurized fluid is supplied to the cylinders 424 and 426, and after the clamp arms 12 and 14 have moved inwards to contact the load, the pressure in the bladders 20 is charged through line 432 by a charging system 434 to a threshold pressure. Once the threshold pressure is reached, further pressurized hydraulic fluid is prevented from being supplied to the cylinders 424 and 426 through lines 412 and 414, thus preventing the cylinders 424 and 426 from further retracting inwards against the load.

The charging system 434 is shown schematically in FIG. 8 as a simple hydraulic cylinder with a piston and a rod, but in many applications, other charging systems may be appropriate. For example, in many embodiments, it may be desired to fill and subsequently pressurize the bladders 20 using water, while the attachment valve assembly supplies pressure to its attached components using oil. In such embodiments, it may be desirable to use a charging system that avoids supplying both oil and water to a common hydraulic cylinder by using multiple elements, such as an oil-pressurized cylinder that drives a bellows filled with water.

Figure 9:
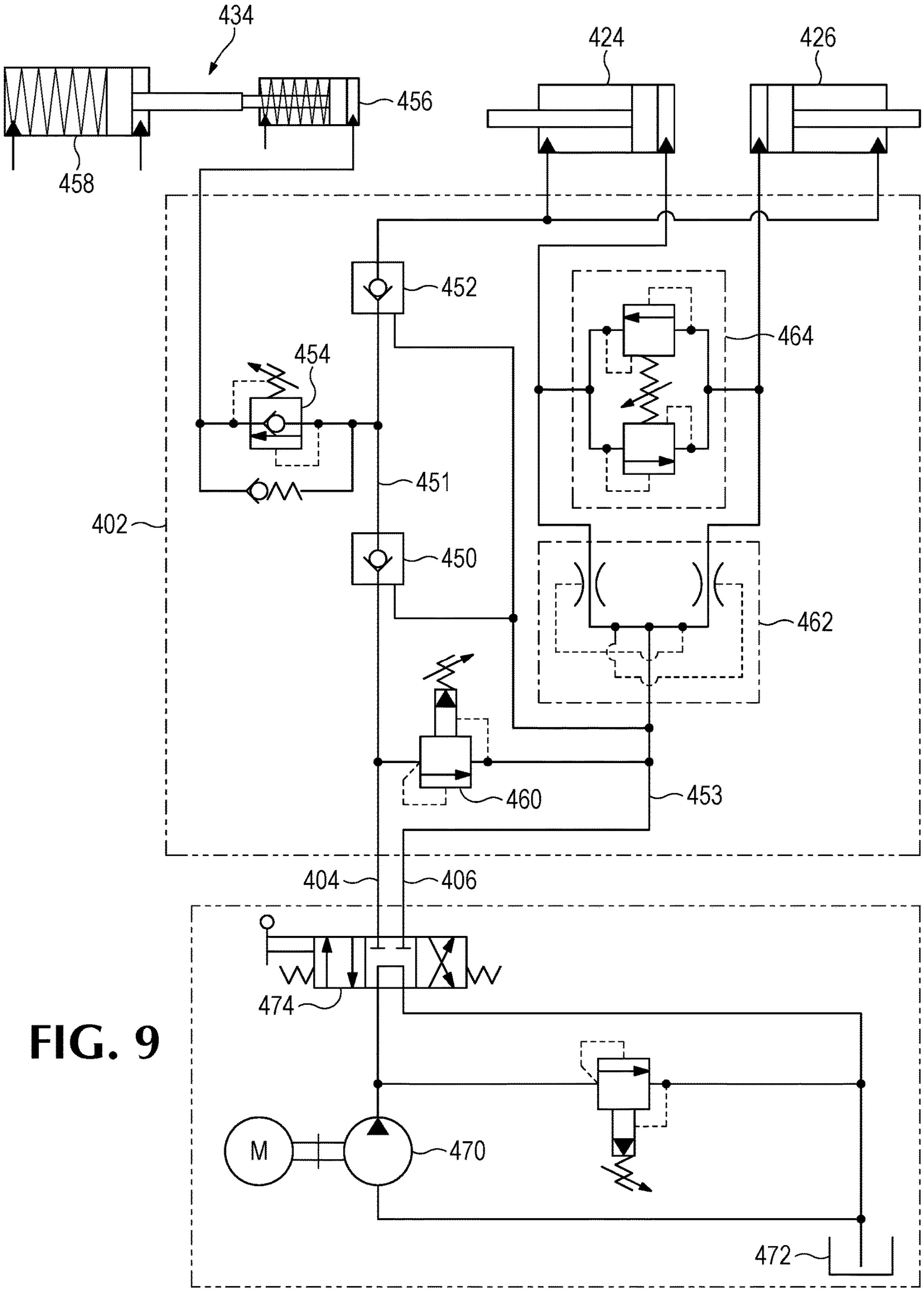
FIG. 9 shows a hydraulic circuit that comprises the attachment valve assembly of FIG. 8.

FIG. 9 shows an exemplary attachment valve assembly 402 that implements the system of FIG. 8. The attachment valve assembly 402 may receive hydraulic fluid from reservoir 472 of a lift truck, and pressurized by a pump 470 on the lift truck. A two-way valve 474 may be used by the operator of the lift truck to selectively direct pressurized fluid to connection 404 and return unpressurized fluid to connection 406, so as to clamp arms 12 and 14, or alternately to selectively direct pressurized fluid to connection 406 and return unpressurized fluid to connection 404, so as to open arms 12 and 14.

When pressurized fluid is provided to connection 404 of the control valve assembly 402, so as to initially move the clamp arms 12 and 13 together towards a load, the pressurized fluid forces open one way valves 450 and 452, so as to retract the rods of positioning cylinders 424 and 426 and close the clamp arms 12 and 14 toward the load. The positioning cylinders 424 and 426 are each preferably configured to provide relatively low force at high pressures. Initially, the bladders 20 are in a retracted and/or deflated state so that, when the clamp arms 12 and 14 contact the load, the force against the load rises faster than the force against the bladders. The pressure in line 451 will rise rapidly until it reaches a threshold pressure set by the spring of pressure relief valve 454, at which point the pressure relief valve 454 will open. In an exemplary embodiment, for instance, the spring of pressure relief valve 454 is configured to open the pressure relief valve 454 when the pressure differential across the pressure relief valve 454 is 1700 psi.

Because, up until the point at which the pressure relief valve 454 opens, the force applied by the positioning cylinders 424 and 426 is absorbed primarily by the load instead of the bladders, when the pressure relief valve 454 does open, the pressure in the bladders will begin to increase. This causes a reactionary increase in the pressure of the positioning cylinders, which closes the one way valve 452, locking the positioning cylinders 424 and 426 in place and preventing them from moving apart from each other. The one way valve 450, however, does not close, and thus further pressure provided to line 451 by the lift truck will pressurize the bladders 20 via the bladder charging system 434, causing the bladders to expand and affirmatively increase the gripping force of the clamp arms 12 and 14 against the load (as opposed to pressurizing in reaction to further closing movement of the clamp arms). Stated differently, the bladder charging system 434 increases the gripping force on the load independently of further inward movement of the clamp arms 12 and 14. Clamp pressure, and the corresponding gripping force, may be increased through the bladder charging system 434 until an upper cut-off pressure in line 451 is reached, after which clamp relief valve 460 opens and prevents any further pressure increase in line 451.

When the operator of the lift truck activates the two-way valve 414 to release the load, the pressure in line 453 opens the pilot control valves 450 and 452 so that pressurized fluid may expand the clamp cylinders 424 and 426 so as to move the clamp arms 12 and 14 away from each other, while fluid is exhausted out of line 451. The pressure relief valve 454 will then close. In some preferred embodiments, the attachment valve assembly 402 includes a flow divider circuit 462 that ensures an equal amount of flow between the clamp cylinders 424 and 426, as well as a bypass circuit 464 that ensures that, should a circumstance arise where no fluid is flowing to or from one of the cylinders 424 or 426 (which might arise, for example, when one clamp arm contacts the load before the other clamp arm), that flow to or from one cylinder may be diverted to the other side of the flow divider circuit.

The charging system 434 preferably comprises a first charging cylinder 456 that uses pressurized oil to pressurize water in a second charging cylinder 458, which is connected to the bladders 20. Each of the first and second charging cylinders 456 and 458 have compression springs that, once the operator opens the clamp arms 12 and 14, and thereby opens the one-way valves 450 and 452 to exhaust unpressurized fluid through line 541, de-pressurizes the fluid in the bladders by exhausting fluid from the cylinder 456 back into the attachment valve assembly 402.

Because, up until the point at which the pressure relief valve 454 opens, the force applied by the positioning cylinders 424 and 426 is absorbed primarily by the load instead of the bladders, those of ordinary skill in the art will recognize that the threshold pressure at which pressure relief valve 454 opens is preferably set low enough, so that the force provided by the positioning cylinders 424 and 426 at that pressure will not cause damage to the load. Similarly, those of ordinary skill in the art will appreciate that other charging systems may be used besides the one depicted in FIG. 9. For example, a single cylinder may be used, such as is depicted in FIG. 8.

It will be appreciated that the invention is not restricted to the particular embodiment that has been described, and that variations may be made therein without departing from the scope of the invention as defined in the appended claims, as interpreted in accordance with principles of prevailing law, including the doctrine of equivalents or any other principle that enlarges the enforceable scope of a claim beyond its literal scope. Unless the context indicates otherwise, a reference in a claim to the number of instances of an element, be it a reference to one instance or more than one instance, requires at least the stated number of instances of the element but is not intended to exclude from the scope of the claim a structure or method having more instances of that element than stated. The word “comprise” or a derivative thereof, when used in a claim, is used in a nonexclusive sense that is not intended to exclude the presence of other elements or steps in a claimed structure or method.

I claim:

1. A hydraulic control circuit for limiting clamp pressure applied by opposed clamp arms against a load, the clamp arms moveable towards and away from each other by at least one positioning unit, the clamp arms each fitted with at least one bladder holding fluid, the hydraulic control circuit comprising:

(a) a charging system different from said at least one positioning unit, the charging system activated by movement of the clamp arms toward each other, and operated by pressurizing the fluid to expand the at least one bladder; where (b) the charging system expands the at least one bladder independently of movement of the clamp arms by the at least one positioning unit.

2. The hydraulic control circuit of claim 1 where the at least one positioning unit is a hydraulic cylinder.

3. The hydraulic control circuit of claim 2 where the fluid is hydraulically isolated from the hydraulic cylinder.

4. The hydraulic control circuit of claim 1 where the charging system imposes a limit on the movement of the clamp arms towards each other.

5. A method for limiting clamp pressure applied by opposed clamp arms against a load, the clamp arms each translatable towards and away from the load by at least one positioning unit, the clamp arms each fitted with a plurality of bladders capable of contacting the load at different times, the method comprising:

(a) actuating the at least one positioning unit until at least one clamp arm of the opposed clamp arms translates to contact the load;

(b) after the at least one clamp arm contacts the load, increasing pressure in the plurality of bladders in a manner independent of further movement of the clamp arms toward the load.

6. The method of claim 5 where a hydraulic cylinder increases the pressure in the plurality of bladders.

7. The method of claim 5 including the step of further moving the clamp arms toward the load after the at least one clamp arm contacts the load.

8. The method of claim 7 including the step preventing movement of the clamp arms toward the load after a threshold pressure in the plurality of bladders is reached.

9. The method of claim 7 including the step of ceasing further increase in the pressure in the plurality of bladders after a threshold pressure in the plurality of bladders is reached.

10. A method for limiting clamp pressure applied by opposed clamp arms against a load, the clamp arms moveable towards and away from the load by at least one positioning unit, the clamp arms each fitted with a plurality of bladders capable of contacting the load at different times, the method comprising:

(a) actuating the at least one positioning unit until at least one clamp arm of the opposed clamp arms contacts the load;

(b) after the at least one clamp arm contacts the load, increasing pressure in the plurality of bladders in a manner independent of further movement of the clamp arms toward the load, where (c) a hydraulic cylinder increases the pressure in the plurality of bladders.

* * * * *